United States Patent [19]
Harkins et al.

[11] 4,364,616
[45] Dec. 21, 1982

[54] DIRECTORY DISPLAY

[75] Inventors: Thomas G. Harkins, Northbrook; Robert D. Peterson, Chicago, both of Ill.

[73] Assignee: Nelson-Harkins Industries, Inc., Chicago, Ill.

[21] Appl. No.: 188,847

[22] Filed: Sep. 19, 1980

[51] Int. Cl.[3] ........................ A47B 77/08; F16B 12/00
[52] U.S. Cl. ........................................ 312/223; 312/111; 312/140; 362/240; 52/732
[58] Field of Search ................ 312/223, 140, 111, 114; 52/732, 241, 574; 362/240, 222, 223

[56] References Cited

U.S. PATENT DOCUMENTS

| | | | |
|---|---|---|---|
| 962,544 | 6/1910 | Anderson | 312/140 |
| 1,848,214 | 3/1932 | Brown | 312/223 |
| 2,370,823 | 3/1945 | Trautner | 362/240 |
| 2,744,716 | 5/1956 | Ringone | 362/223 |
| 3,160,246 | 12/1964 | Donlon | 52/241 |
| 3,494,686 | 2/1970 | Diack | 312/140 |
| 3,675,594 | 7/1972 | Kritske | 312/111 |

FOREIGN PATENT DOCUMENTS

| | | | |
|---|---|---|---|
| 1463144 | 12/1966 | France | 362/223 |

OTHER PUBLICATIONS

Nelson-Harkins Industries, Inc., Catalog No. 110-D, (p. 3).

*Primary Examiner*—Victor N. Sakran
*Attorney, Agent, or Firm*—Hill, Van Santen, Steadman, Chiara & Simpson

[57] ABSTRACT

A building directory display system is disclosed having a light source positioned within a housing and a darkened glass door on the front of the housing. Directly behind the glass door, a plurality of panels are provided on which name strips are positioned. The panel also has a diffuser panel which diffuses light from the light source which then passes through the name strips having a black coating selectively etched to permit light passage therethrough. In order to prevent light from shining through cracks between the panels, each panel has side frames which overlap with one another and which, in combination with a panel retaining frame, permit simple removal of the panels for servicing.

11 Claims, 7 Drawing Figures

DIRECTORY DISPLAY

BACKGROUND OF THE INVENTION

1. Field of the Invention

The invention relates to building directory displays employing panels having name strips provided thereon.

2. Description of the Prior Art

It is known to provide a building directory display system wherein a housing is provided which has a front glass door, such as shown in FIG. 1 at 13, which permits access to a plurality of panels 14 containing a plurality of name strips 16. The name strips 16 are positioned on a light diffuser panel 17. T-shaped channels 19 of heavy gauge aluminum are mounted within the housing in rigid fashion. The panels 14 are laid against these aluminum "Ts" and the light from light source 18 shines through the light diffuser so as to illuminate indicia which is etched off of the name strips 16 in a selective manner, the name strips 16 being coated with a black paint or other coating material. Preferably the glass door 13 is darkened. It is important that light not show through any cracks between the panels 14 since such cracks of light would interfere with the overall aesthetic appearance provided by the "black effect" which results when viewing the overall display through the darkened glass door 13. With the "black effect," all of the figures or indicia being displayed appear to an observer to be contrasted against a totally black background. The breaks between the panels 14 are not visible by the casual observer.

With this prior art housing and frame system, the aluminum T members must be strong and are costly to construct. Since such directory display systems for buildings cannot be mass produced due to the different specifications of each purchaser, the time of construction of the prior art system is excessive since each T section must be individually bolted or welded to an exterior panel retaining frame within the housing. Also, the front edge of each of the T sections had to be painted black in order to assure a black field. Furthermore, these front edges where an additional break in the black field which had to be masked by careful painting and alignment of the panels within the display system.

A further disadvantage of the prior art systems was the inability to interchange larger panel widths for existing smaller panel widths in a given display system, since the T sections were welded in place at a given spacing. Consequently, the manufacturer of a standard panel size is almost totally precluded in the prior art systems.

SUMMARY OF THE INVENTION

It is an object of the invention to provide an improved building directory display system which insures that light is not emitted through cracks between panels containing name plates within the display system, and yet may be easily manufactured with standard components and which requires minimal labor for construction.

According to the invention, a directory display system is provided which has a panel supporting frame with top and bottom channel members which receive a plurality of removable panels positioned side-by-side. The panels have the name strips supported on a surface of a diffuser panel. The upper channel of the panel supporting frame has a free space to allow lifting the panel such that a bottom end of the panel with clear the bottom channel and permit the panel to be lifted free of the display system. Each of the panels has first and second side frames parallel to one another which have channels for receiving the edges of the name strips and diffuser panel, preferably completely on one side of a longitudinal center line of the channel. Each of the side frames also has projections opposite the channel and positioned to one side of the center line. The projections provide a surface for abutting adjacent panels against one another while simultaneously preventing light from shining through cracks between the panels. The projections provide an overlap on adjacent sides of adjacent panels to block light transmission. In other words, on a first panel the projection is to one side of the center line, and on an adjacent panel on a side adjacent the first panel, the projection is located on the opposite side of the center line. This design permits one to remove the panels by lifting them vertically so they will clear the bottom channel of the panel retaining frame, while simultaneously providing the light blocking function.

Most importantly, with the system of the invention, assembly time is drastically reduced since standard size panels can be employed and multiples of such panels may be provided for display systems of various widths. Furthermore, the panels are symmetrical to one another and the side frames can be manufactured from extruded plastic.

DESCRIPTION OF THE PREFERRED EMBODIMENTS

Figure 2:
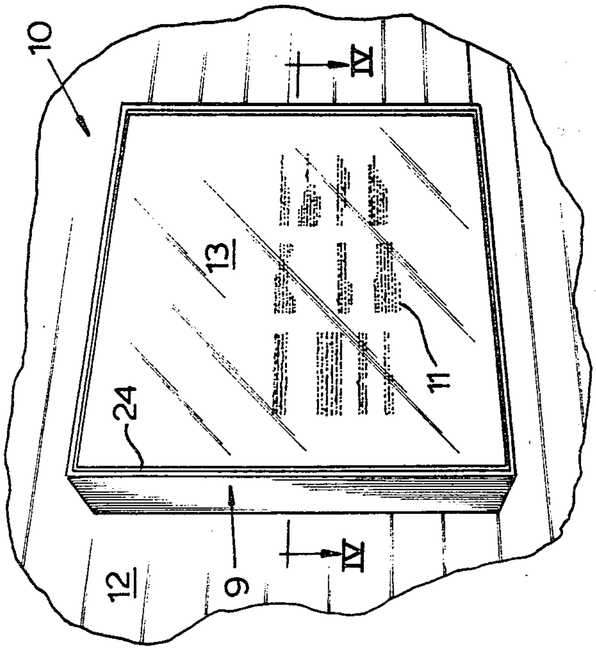
FIG. 2 is a perspective view of the building display system of the invention.

The building directory display generally shown at 10 in FIG. 2 of this invention employs what is known as the "black effect" wherein an observer viewing the names 11 arranged generally in vertical columns sees the names as white indicia surrounded by a totally black background with no edges or corners visible within the display field. In addition to names, figures such as floor plans might be employed in the display board 10. A main housing or frame 9 has a glass door 13 which is somewhat darkened so as to reduce light transmission by 10%, for example.

Figure 3:
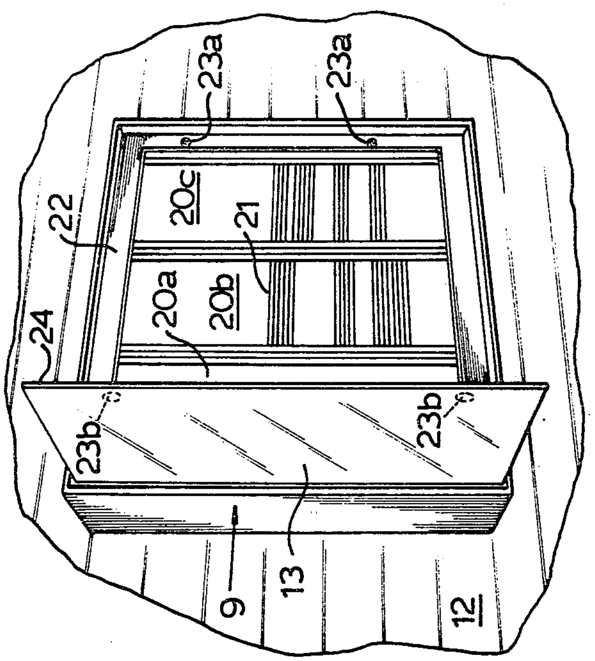
FIG. 3 is a perspective view of the display system of FIG. 2 with the glass door opened.

When the door 10 is opened as shown in FIG. 3, for example, removable panels such as *20a*, *20b* and *20c* can be observed. These panels can be removed by lifting so as to clear a bottom of the panel, thus permitting the panel to be slipped downwardly and away from the system. On each of the removable panels a name strip 21 is provided having a blackened coating *21a* thereon which is selectively etched in accordance with indicia or figures to be placed thereon. The light then shines through the etched away portions of the coating.

The removable panels are retained in a panel supporting frame 22.

In order to maintain the glass door in a closed position, a Velcro hold down 23*a* on the frame mates with a corresponding Velcro mating portion 23*b* (Velcro is a registered trademark).

Around the glass door a door frame 24 of slim appearance in accordance with an aspect of the invention is provided.

Figure 4:
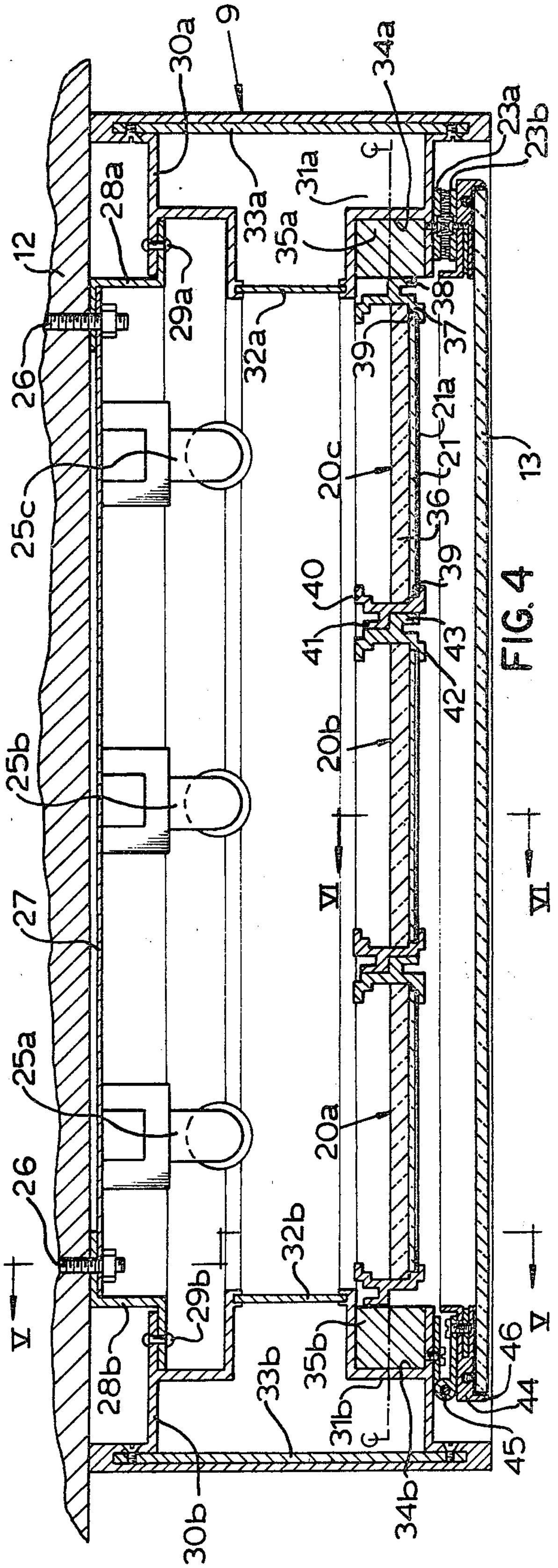
FIG. 4 is a top view with expanded depth dimensions to clearly illustrate the construction of the display system of the invention.

As shown in FIG. 4, light sources 25*a,b* and *c*, preferably fluorescent tubes, are provided mounted to a backplate 27 on the housing main frame 9. The assembly is retained on a wall 12 by use of bolts 26 threaded to wall brackets 28*a,b* and backplate 27. Rivets 29*a,b* fasten the brackets 28*a,b* to a rear portion of a panel supporting side member. At a front of the assembly, an extruded panel supporting frame side member at each side has a respective portion 31*a,b* forming a respective side channel 34*a,b* which receives a respective side spacing block 35*a,b*.

The display system frame is held together by locking members 33*a,b* retained by screws.

Figure 6:
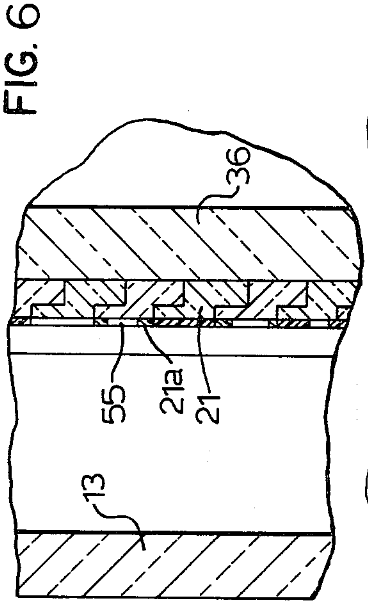
FIG. 6 is a fragmentary enlarged view of the name strips employed on the panels of the display system of the invention.
Figure 1:
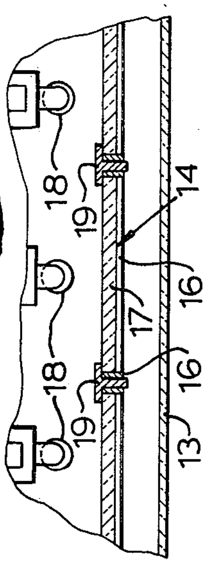
FIG. 1 (PRIOR ART)
FIG. 1 is a fragmented top view of a prior art directory display system.

Each panel 20*a*, 20*b*, 20*c* is comprised of a preferably white diffuser panel 36 on which a plurality of name strips 21 are aligned horizontally in interlocking fashion as shown more clearly in FIG. 6. Each name strip has a black coating 21*a* thereon which is selectively etched. Along the outer edges of the diffuser panel 36 and name strips 21 first and second reversible extruded side frames 37 and 40 are provided, each of which form a channel for receiving the name strips and diffuser panel. Opposite these channels are respective L-shaped projections 38 or 41. Preferably the diffuser panel 36 lies to one side of a center line shown in FIG. 4 of the side frames, and in the embodiment of FIG. 4 the projection 38 lies to one side of the center line while the projection 41 lies to the opposite side. The three panels shown are symmetrical to one another and consequently can interlock when placed side-by-side.

Adhesive 39 is provided to retain the side frames to the diffuser panel.

As can be seen in FIG. 4, with the panels abutting one another, the L-shaped projection 41 overlaps the L-shaped projection 43 of a second adjacent panel so as to prevent light from showing through a crack between the panels. Also, the ends of the projections 41 and 43 respectively abut the free space to the other side of the center line on the adjacent panel side frame. Also, the projection 38 overlaps a portion of the channel provided at 34*a* and similarly an overlap is provided at the channel 34*b* on the opposite side of the system. Again, the projection of light through cracks at the side edges where the panels meet the side spacers is reduced.

To remove the panel 20*a*, one would lift the panel to free the bottom channel and then lift out the entire panel. Panel 20*b* could then be removed, followed by the removal of panel 20*c*.

The glass door 13 is retained to the system by a door frame 44 surrounding the glass door, and with this frame being retained by hinges 45 adjacent side channel 34*b*.

Figure 5:
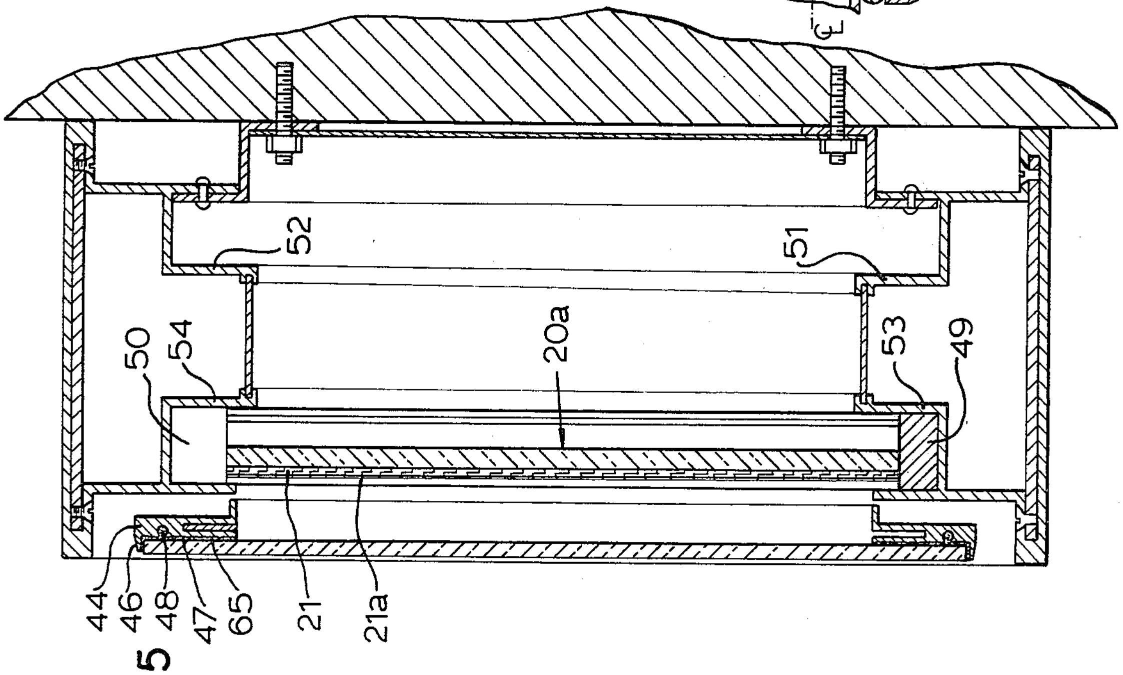
FIG. 5 is a side view of the display system of FIG. 4.

As shown in FIG. 5, the door frame 44 has a narrow profile when viewed from the front since a narrowed lip portion 46 is provided which does not overlap a front surface of the glass door. Adhesive 47 is applied along a ribbed surface 65 and also into a channel 48 which receives adhesive to enhance bonding.

The bottom channel 53 has a bottom spacer 49 and the top channel 54 has a free space 50 which allows lifting of the panel for removal. Again, light cannot shine through cracks at the bottoms or tops of the panels.

FIG. 6 illustrates the interlocking name strips 21 and also the provision of a black coating 21*a* with selectively etched off portions 55.

Figure 7:
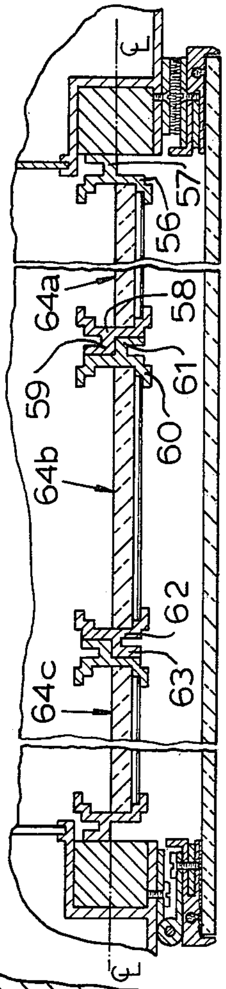
FIG. 7 is a top view of an alternate embodiment of the invention.

FIG. 7 illustrates an alternate embodiment of the invention wherein the first and second side frames of a given panel have their protrusions 57 and 59 in panel 64*a*, as an example, to the same side of the center line. In the adjacent panel 64*b* these protrusions 61 and 63 are to the opposite side of the center line.

To remove a panel in FIG. 7, the middle panel 64*b* would be removed followed by the removal of panels 64*a* and 64*c*.

With this invention, by providing the side frames in the manner described and also by employing panel dimensions which make use of the center line or symmetrical portion of the panels and frames, interchangeability is achieved in a variety of situations.

Although various minor modifications may be suggested by those versed in the art, it should be understood that we wish to embody within the scope of the patent warranted hereon, all such embodiments as reasonably and properly come within the scope of our contribution to the art.

We claim:

1. A directory display system, comprising:
   - a main frame with a back panel;
   - a light source mounted within the main frame;
   - at least two adjacent removable panels positioned vertically and in front of the light source in a panel supporting frame having two side members and a top and bottom member;
   - the top and bottom members each having a channel within which the panels are positioned, the top member channel having a free space permitting upward movement of the panels to allow a bottom of a panel being lifted to clear the bottom member channel and allow removal of the panel;
   - each of the panels having a light diffuser panel and indicia strips thereon with a coating thereon preventing transmission of light from the light source, the coating being selectively removed in the shape of indicia or figures desired to be displayed such that diffused light can pass therethrough;
   - each of the panels having first and second substantially identically constructed side frames parallel to one another and fastened at respective vertical side edges of said light diffuser panel and indicia strips, each side frame having a channel receiving the vertical side edges, and a single projection opposite the channel, said single projection lying to one side of a depth center line of the side frame and having an overlapping surface positioned at the depth center line, each of said side frames being usable on either the left or right side edges of the light diffuser panel; and
   - one of the panels having one of its side frame projections abutting against one of the side members of the panel supporting frame, and the other side frame projection having its overlapping surface in abutment with the overlapping surface of the side frame projection of a laterally adjacent second panel, the overlapping surfaces lying on opposite sides of the center line, and wherein substantially no light can pass from the light source through cracks between the first and second panels and wherein the same side frames may be employed on either the left or right side edges of the panels.

2. The system of claim 1 wherein the projections on the panel side frames are L-shaped.

3. The system of claim 1 wherein in each of the panels, the indicia strips and diffusion panel lie entirely to one side of the side frame center line.

4. The system of claim 1 wherein the panel supporting frame side members each have a channel with a side spacing block therein against which the panel side frame projection abuts, a portion of the channel partially overlapping the projection so as to reduce light passage at a crack between the projection and side spacing block.

5. The system of claim 1 wherein the panel supporting frame bottom member channel has a bottom spacing block therein against which a bottom edge of each of the panels rests.

6. The system of claim 1 wherein the glass door is darkened to reduce light transmission and enhance a "black effect" when viewing the display indicia surrounded by a black background provided by a black coating on the indicia strips.

7. The system of claim 1 wherein a front glass door is provided on the main frame and a frame is provided around the glass door which does not overlap a front face of the glass door.

8. The system of claim 1 wherein an adhesive channel is provided in the glass door frame on a surface of the frame which contacts a rear surface of the glass, and said rear surface has ridges which together with the adhesive channel enhance an adhesive bond between the glass door and frame.

9. The system of claim 1 wherein the panel first and second side frames are extruded.

10. The system of claim 1 wherein the panel first and second side frames are constructed of plastic.

11. A directory display system, comprising:

a housing;

a light source mounted within the housing;

at least two removable panels retained in the housing by a panel supporting frame comprised of a top channel and a bottom channel;

each of the panels having a dark background and indicia through which light from the light source shines;

each of the panels having first and second substantially identical side frames along vertical edges thereof which may be used on either the left or right vertical edges of each panel; and each of the side frames having a single projection, said single projection lying to one side of a vertical depth center line of the side frame such that when two panels are in a side-by-side abutting relationship, the projections each have an overlap surface adjacent and abutting one another at the center line wherein light is prevented from shining through cracks between adjacent panels as a result of overlap of the projections and wherein the same side frames may be employed on either the left or right edges of each panel.

* * * * *